United States Patent
Iwaki

(10) Patent No.: US 11,861,058 B2
(45) Date of Patent: *Jan. 2, 2024

(54) COMMUNICATION DEVICE, COMMUNICATION METHOD, AND COMMUNICATION PROGRAM

(71) Applicant: DWANGO Co., Ltd., Tokyo (JP)

(72) Inventor: Shinnosuke Iwaki, Tokyo (JP)

(73) Assignee: DWANGO CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/953,452

(22) Filed: Sep. 27, 2022

(65) Prior Publication Data
US 2023/0075863 A1    Mar. 9, 2023

Related U.S. Application Data

(63) Continuation of application No. 17/419,987, filed as application No. PCT/JP2019/041893 on Oct. 25, 2019, now Pat. No. 11,500,456.

(30) Foreign Application Priority Data

Mar. 29, 2019 (JP) .................. 2019-066719

(51) Int. Cl.
*G06F 3/01* (2006.01)
*G06F 3/14* (2006.01)
(Continued)

(52) U.S. Cl.
CPC ............ *G06F 3/011* (2013.01); *G06F 3/1454* (2013.01); *G06F 13/00* (2013.01); *G06T 19/00* (2013.01)

(58) Field of Classification Search
CPC ........ G06F 3/011; G06F 3/1454; G06F 13/00; G06T 19/00
(Continued)

(56) References Cited

U.S. PATENT DOCUMENTS 10,354,256 B1 *  7/2019  McInerny ............... G06T 13/40
10,445,917 B2 * 10/2019  Sawaki ................... G06F 3/011
(Continued)

FOREIGN PATENT DOCUMENTS

CN        105765620 A        7/2016
CN        106540450 A        3/2017
(Continued)

OTHER PUBLICATIONS

PCT/JP2019/041893 International Search Report and Written Opinion dated Jan. 7, 2020, 1 pgs.
CN201980094223.X Office Action dated May 26, 2023, 10 pgs.

*Primary Examiner* — Tom V Sheng
(74) *Attorney, Agent, or Firm* — Bracewell LLP; Doug F. Stewart; Patrick J. Connolly

(57) ABSTRACT

When cheering of a distributor avatar by virtual avatars has been detected and the distributor avatar reacts to the cheering, a reaction motion is performed for the virtual avatars that cheered, and a normal motion that is not a reaction motion is performed for the viewer avatars that did not cheer. The motion performed for the virtual avatars that cheered differs from the motion performed for the viewer avatars that did not cheer based on timing indicated by the distributor. Either the motion performed for the virtual avatars that cheered or the motion performed for the viewer avatars that did not cheer is a predetermined motion.

7 Claims, 12 Drawing Sheets

(51) Int. Cl.
*G06F 13/00* (2006.01)
*G06T 19/00* (2011.01)

(58) Field of Classification Search
USPC .......................................................... 345/156
See application file for complete search history.

(56) References Cited

U.S. PATENT DOCUMENTS

| | | | | |
|---|---|---|---|---|
| 11,500,456 B2* | 11/2022 | Iwaki | ................ | G06T 13/40 |
| 2004/0103146 A1* | 5/2004 | Park | ................ | A63B 24/0087 |
| | | | | 709/204 |
| 2010/0241512 A1* | 9/2010 | Tirpak | ................ | A63F 13/30 |
| | | | | 705/26.1 |
| 2011/0055727 A1* | 3/2011 | Dawson | ................ | G06F 3/04815 |
| | | | | 709/204 |
| 2011/0225514 A1* | 9/2011 | Goldman | ................ | G06T 19/00 |
| | | | | 715/757 |
| 2011/0225519 A1* | 9/2011 | Goldman | ................ | G06T 19/00 |
| | | | | 715/757 |
| 2011/0244954 A1* | 10/2011 | Goldman | ................ | A63F 13/86 |
| | | | | 463/30 |
| 2012/0156652 A1* | 6/2012 | Lane | ................ | F41J 9/14 |
| | | | | 434/11 |
| 2016/0267577 A1* | 9/2016 | Crowder | ................ | G06Q 30/0643 |
| 2016/0286275 A1* | 9/2016 | Maeda | ................ | G06Q 30/0631 |
| 2017/0001111 A1* | 1/2017 | Willette | ................ | A63F 13/49 |
| 2017/0097686 A1 | 4/2017 | Song et al. | | |
| 2017/0213473 A1* | 7/2017 | Ribeira | ................ | G09B 5/10 |
| 2017/0262877 A1* | 9/2017 | Davey | ................ | G06Q 30/0242 |
| 2018/0005441 A1 | 1/2018 | Anderson | | |
| 2018/0286099 A1* | 10/2018 | Kozloski | ................ | G06T 1/60 |
| 2018/0335927 A1* | 11/2018 | Anzures | ................ | H04L 51/52 |
| 2018/0345129 A1* | 12/2018 | Rathod | ................ | H04W 4/029 |
| 2019/0342507 A1* | 11/2019 | Dye | ................ | G06T 13/40 |
| 2019/0384382 A1* | 12/2019 | Hasegawa | ................ | A63F 13/525 |
| 2020/0065889 A1 | 2/2020 | Kline et al. | | |
| 2020/0082214 A1* | 3/2020 | Salammagari | ................ | G06F 40/30 |
| 2020/0098366 A1* | 3/2020 | Chakraborty | ................ | G06N 3/004 |
| 2020/0145616 A1* | 5/2020 | Nassar | ................ | H04M 3/567 |
| 2020/0193976 A1* | 6/2020 | Cartwright | ................ | G06F 3/011 |
| 2020/0202849 A1* | 6/2020 | Cartwright | ................ | G06F 3/167 |
| 2021/0204014 A1* | 7/2021 | Kawakami | ................ | H04N 21/2187 |
| 2021/0368136 A1 | 11/2021 | Chalmers et al. | | |
| 2022/0036433 A1* | 2/2022 | Milbank | ................ | G06Q 30/0633 |
| 2022/0095008 A1 | 3/2022 | Otsuka et al. | | |

FOREIGN PATENT DOCUMENTS

| | | |
|---|---|---|
| CN | 107248185 A | 10/2017 |
| JP | 2003324709 A | 11/2003 |
| JP | 2010066790 A | 3/2010 |
| JP | 2015090526 A | 5/2015 |
| JP | 2018007828 A | 1/2018 |
| JP | 2018110377 A | 7/2018 |
| JP | 6469279 B1 | 2/2019 |
| KR | 20160077038 A | 7/2016 |

* cited by examiner

[Fig. 1]
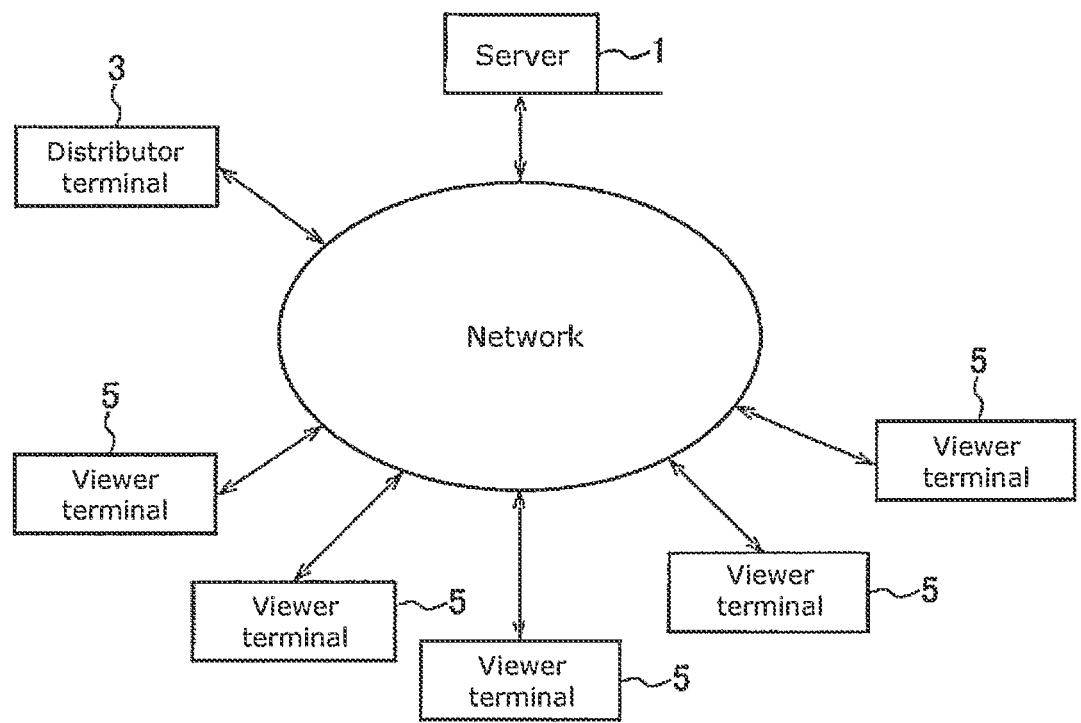
[Fig. 2]
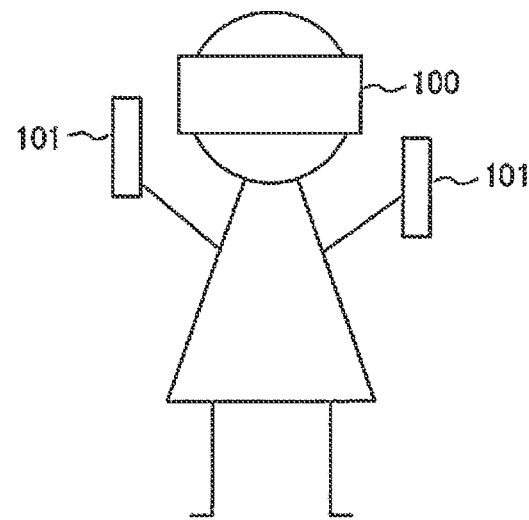

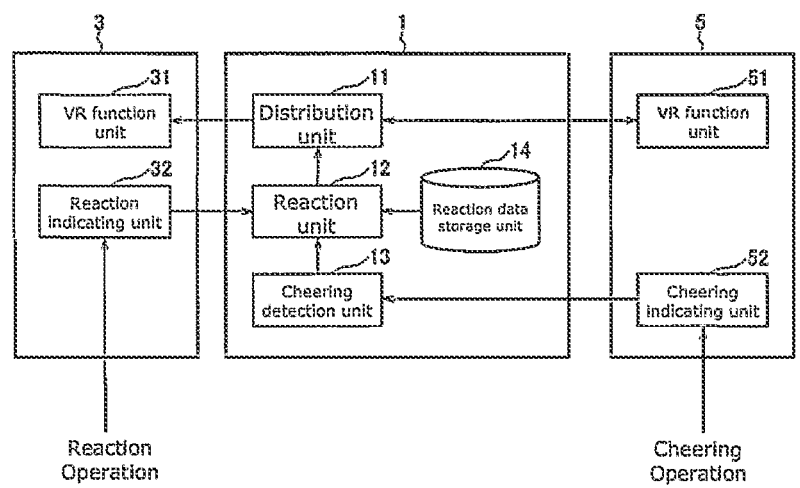
[Fig. 3]

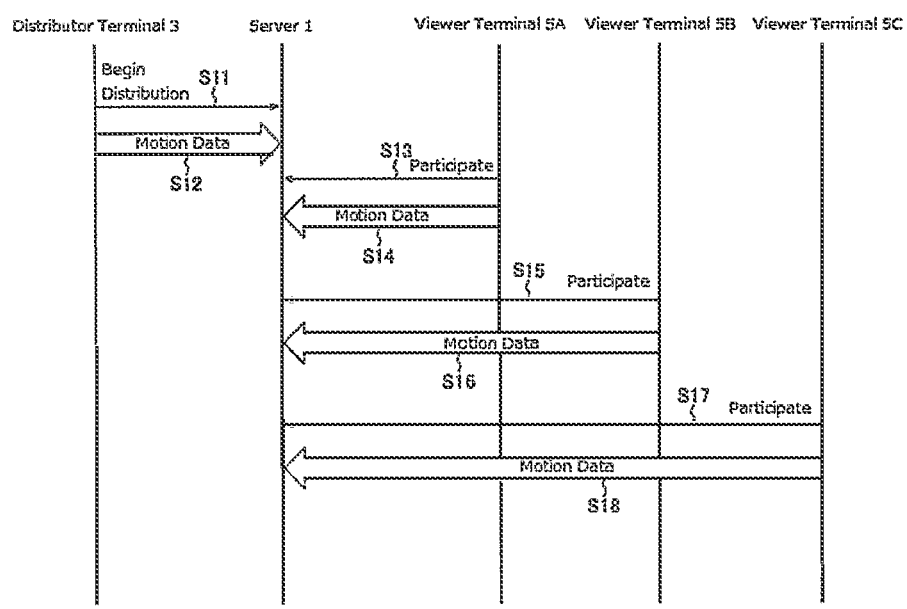
[Fig. 4]

[Fig. 5]
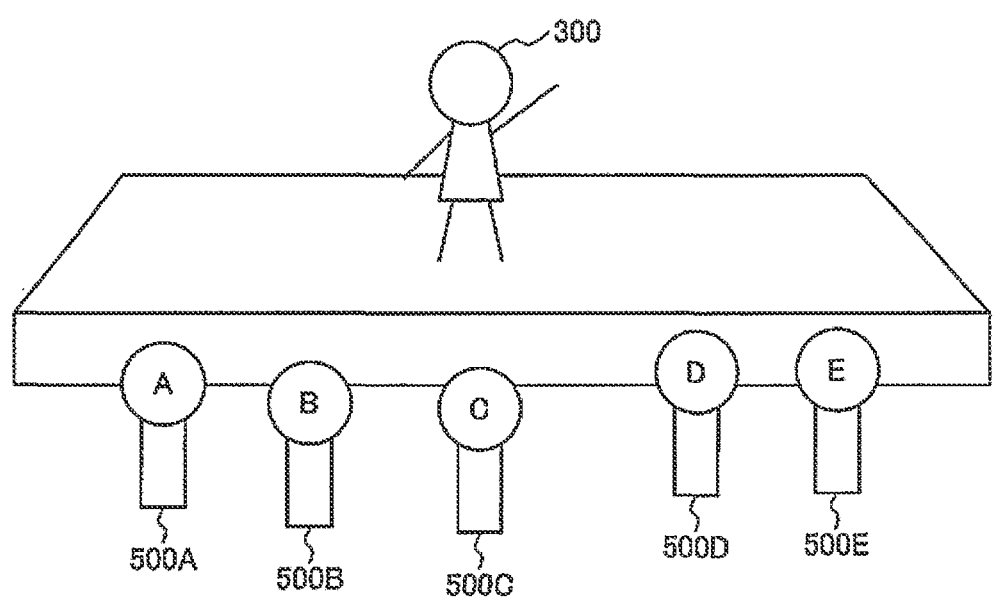

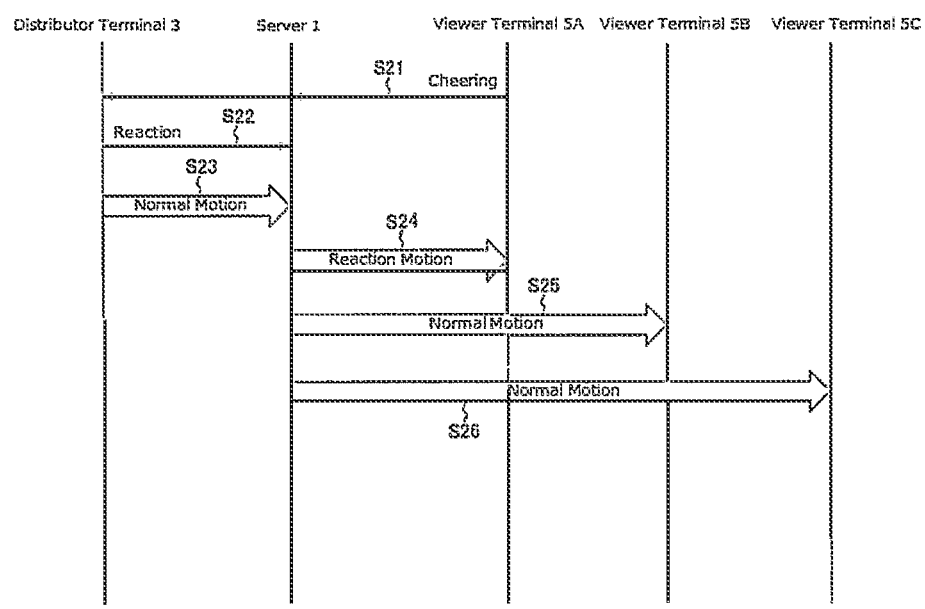
[Fig. 6]

[Fig. 7]
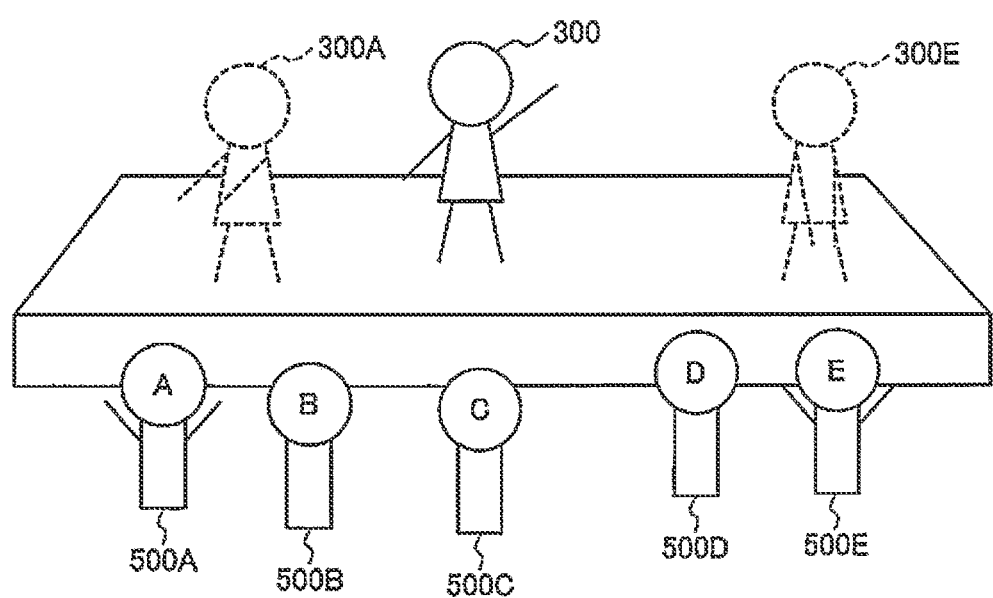

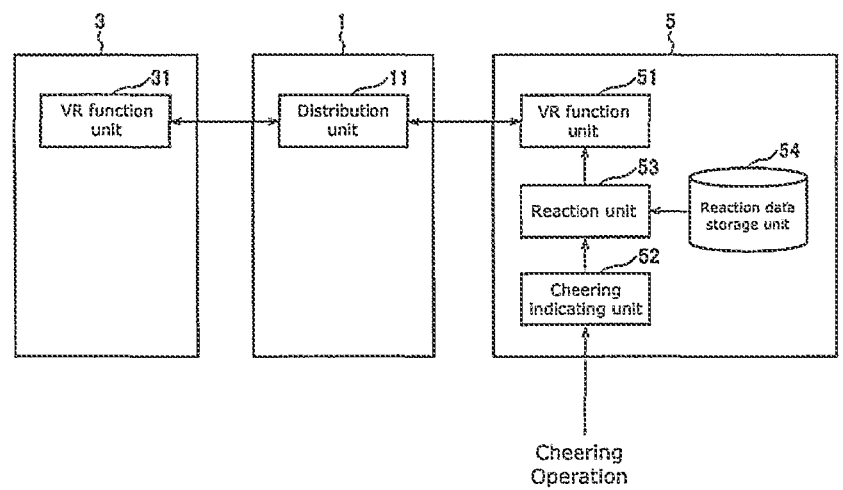
[Fig. 8]

[Fig. 9]
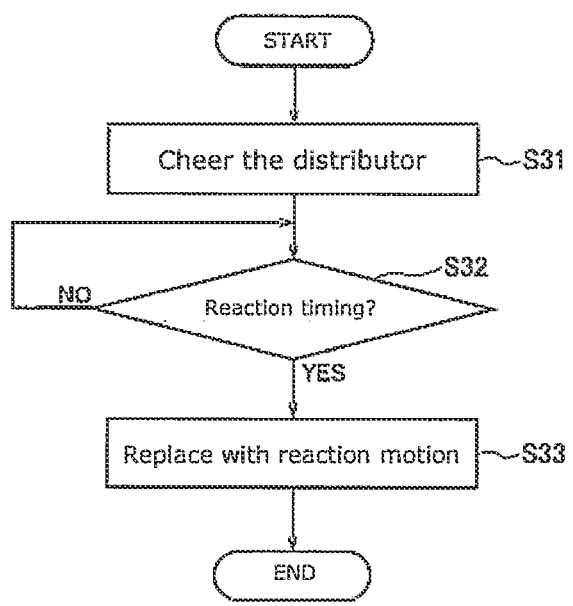

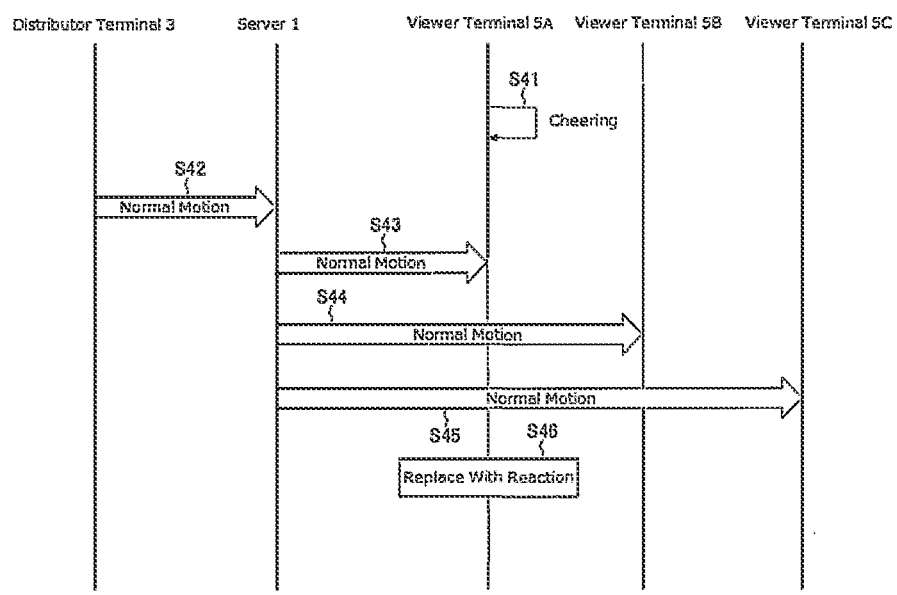
[Fig. 10]

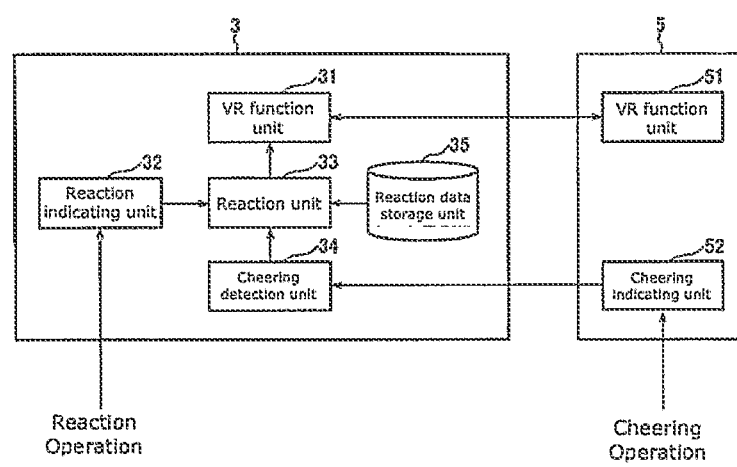
[Fig. 11]

[Fig. 12]
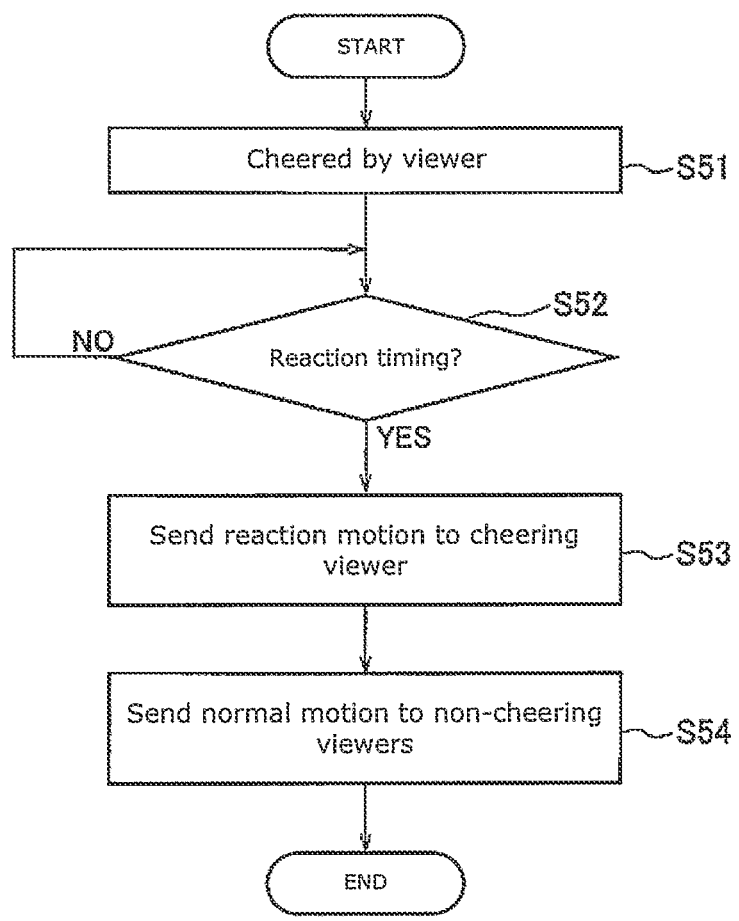

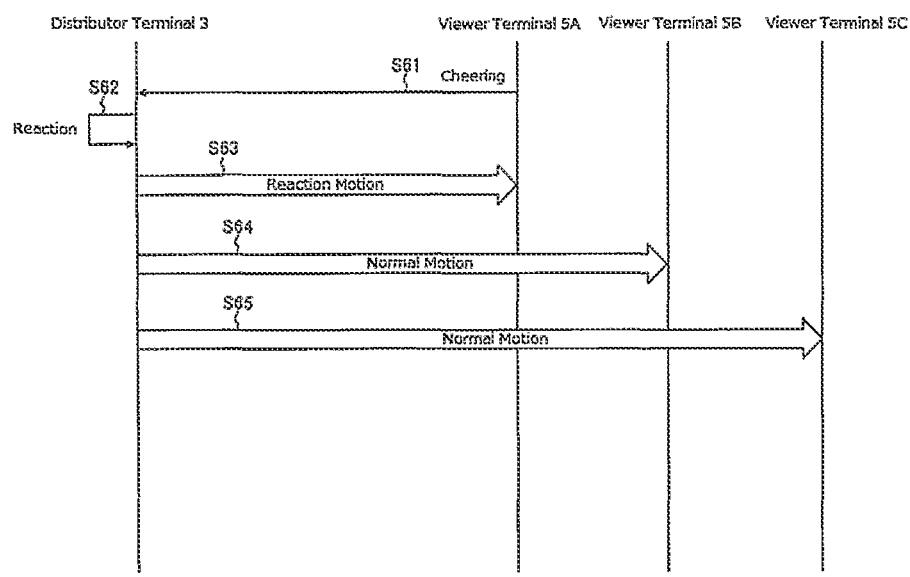
[Fig. 13]

COMMUNICATION DEVICE, COMMUNICATION METHOD, AND COMMUNICATION PROGRAM

This application is a continuation application of U.S. application Ser. No. 17/419,987, filed on Jun. 30, 2021.

TECHNICAL FIELD

The present invention relates to a technique for distributing live content in a virtual reality (VR) space.

BACKGROUND ART

In recent years, services enabling the live-streaming of computer graphics characters ("avatars") in virtual reality (VR) space have become increasingly popular.

In these services, the distributor wears a head-mounted display (HMD) and holds controllers in both hands that reflect movement by the distributor in the form of an avatar for livestreaming.

Viewers can simply watch the live stream or wear an HMD to participate in the live stream. Viewers can communicate with the distributor by having their avatar participate in the distributor's VR space.

CITATION LIST

Patent Literature

Patent Document 1: JP 2018-007828 A
Patent Document 2: JP 2018-094326 A

SUMMARY OF INVENTION

Technical Problem

Viewers can have their viewer avatar perform cheering actions to liven up a livestream but the distributor cannot react to all viewers. Viewers may stop cheering if they don't get a reaction from the distributor, and the livestream may become less lively.

Patent Document 1 describes a technique in which player avatars are seated in a VR space as one of many fans experiencing a live performance by a pop culture idol character, and the players within the line of sight cheer the idol character. In Patent Document 1, special individualized fan services are provided by the idol character to player avatars who meet certain activation conditions such as points given when they cheer. When players compete for points in Patent Document 1, the live performance becomes livelier. The special fan services are available only to individual players in the audience, and cheering players do not always get a reaction from the idol character.

In light of this situation, it is an object of the present invention to make it easier for viewers to get a reaction from a distributor.

Solution to Problem

One aspect of the present invention is a communication device for handling communication between a distributor avatar and viewer avatars in the same virtual space, the communication device comprising: a cheering detection unit that detects cheering of the distributor avatar by a first viewer avatar; and a reaction unit that makes a motion toward the first viewer avatar that cheered a motion performed by the distributor avatar different from a motion toward a second viewer avatar that did not cheer the motion performed by the distributor avatar when the distributor avatar reacts to cheering.

Effects of Invention

The present invention makes it easier for viewers to get a reaction from a distributor.

BRIEF DESCRIPTION OF DRAWINGS

FIG. 1 is a diagram showing an example of an overall system configuration used to provide a livestreaming service.

FIG. 2 is a diagram used to describe the devices used to operate an avatar.

FIG. 3 is a functional block diagram showing an example of the configuration of each device used to provide a livestreaming service.

FIG. 4 is a sequence chart showing the processing flow in which a distributor begins livestreaming and viewers participate in the program.

FIG. 5 is a diagram showing a VR space in which viewers participate.

FIG. 6 is a sequence chart showing the processing flow in which a normal motion is replaced by a reaction motion when a viewer cheers the distributor.

FIG. 7 is a diagram showing a VR space in which the distributor reacts to a viewer.

FIG. 8 is a functional block diagram showing an example of the configuration of each device used to provide a livestreaming service.

FIG. 9 is a flowchart showing the processing flow in which a normal motion is replaced by a reaction motion on a viewer terminal.

FIG. 10 is a sequence chart showing the processing flow in which a normal motion is replaced by a reaction motion when a viewer cheers the distributor.

FIG. 11 is a functional block diagram showing an example of the configuration of each device used to provide a livestreaming service.

FIG. 12 is a flowchart showing the processing flow in which a normal motion is replaced by a reaction motion on a viewer terminal.

FIG. 13 is a sequence chart showing the processing flow in which a normal motion is replaced by a reaction motion when a viewer cheers the distributor.

DESCRIPTION OF EMBODIMENTS

Embodiments of the present invention will be described with reference to the drawings.

1st Embodiment

The overall system configuration used to provide a livestreaming service in the first embodiment will now be described with reference to FIG. 1.

The livestreaming service of the present embodiment is a livestreaming service that allows a distributor to become an avatar in a VR space and distribute a live broadcast program. In this livestreaming service, viewers can also participate in the program as viewer avatars in the same VR space as the distributor. The livestreaming service is provided using a server 1, a distributor terminal 3, and viewer terminals 5 connected to the network. There are five viewer terminals 5 in FIG. 1, but the number of viewer terminals 5 is larger in reality and any number of viewer terminals 5 can participate.

The server 1 receives livestreaming video in VR space from the distributor terminal 3 via the network, and distributes the livestreaming video to viewer terminals 5. Specifically, the server 1 receives motion data of the distributor avatar from the distributor terminal 3 and distributes the motion data to viewer terminals 5. The viewer terminals 5 reflect the received motion data in the distributor avatar rendered in VR space. When VR space is rendered and displayed on a viewer terminal 5, the viewer terminal 5 has the model data needed to render the VR space. For example, a viewer terminal 5 may receive model data such as an avatar in VR space from the server 1 or may store the model data in advance.

When a viewer participates in the program, the server 1 receives motion data of the viewer avatar from the viewer terminal 5 and distributes the motion data to the distributor terminal 3 and to other viewer terminals 5. The distributor terminal 3 and the other viewer terminals 5 reflect the received motion data in the viewer avatar rendered in the VR space. The model data for the viewer avatar may be received from the server 1 when the viewer participates, or may be stored in advance by the distributor terminal 3 and the viewer terminals 5.

Viewers who participate in the program can cheer the distributor via viewer avatars. The distributor avatar responds with a reaction to a viewer avatar that has cheered.

When the distributor avatar reacts to cheering, the server 1 makes a motion toward a viewer avatar that cheered a motion performed by the distributor avatar different from a motion toward a viewer avatar that did not cheer the motion performed by the distributor avatar. Specifically, the server 1 distributes motion data in which some of the motion by the distributor avatar is changed to a reaction motion to the viewer terminal 5 of a viewer who cheered, and normal motion data is delivered to the viewer terminal 5 of a viewer who has not cheered. In other words, when the distributor avatar reacts, the motion of the distributor avatar is different for viewers that cheer and viewers that do not cheer.

The distributor terminal 3 is a terminal used by the distributor for livestreaming. The distributor terminal 3 can be, for example, a personal computer connected to an HMD.

As shown in FIG. 2, the distributor wears an HMD 100 and holds a controller 101 in both hands to control the distributor avatar.

The HMD 100 detects movement of the distributor's head. Head movement detected by the HMD 100 is reflected in the distributor avatar. The distributor can move his or her head and look around the VR space. The HMD 100 renders the VR space in the direction the distributor is facing. The HMD 100 imparts parallax to the right-eye image and the left-eye image so that the distributor can see the VR space in three dimensions.

The controllers 101 detect the movement of the distributor's hands. The hand movements detected by the controllers 101 are reflected in the distributor avatar.

The distributor terminal 3 sends motion data that reflects detected movement by the distributor in the distributor avatar to the server 1. This motion data is distributed to viewer terminals 5 by the server 1. The distributor terminal 3 also receives motion data from viewer avatars who are participating in the distributor's program from the server 1. The distributor terminal 3 reflects the received motion data in the viewer avatars rendered in the VR space.

The controllers 101 include a control means such as buttons. When the distributor operates these buttons, the distributor avatar can be made to perform predetermined movements. One of the operations related to the present embodiment can be, for example, an operation for indicating the timing for responding with a reaction to cheering by a viewer. When a viewer avatar cheers the distributor avatar and the distributor has indicated the timing for replying with a reaction, the distributor terminal 3 sends a reaction signal to the server 1. The server 1 makes the reaction motion to the viewer avatar who cheered different from the motion to the viewer avatars that did not cheer, and causes the distributor avatar to react to the cheering.

A viewer terminal 5 is a terminal used by a viewer to watch a livestream. Like the distributor terminal 3, the viewer terminal 5 can be a personal computer connected to an HMD.

The viewer can participate in the distributor's program. When the viewer performs an operation to participate in the program, a viewer avatar that the viewer can control appears in the VR space along with the distributor avatar. As shown in FIG. 2, the viewer also wears an HMD 100 and holds controllers 101 in both hands to control the viewer avatar. The viewpoint of a viewer who participates in a program is the viewpoint of the viewer avatar in the VR space. In other words, the HMD 100 renders the VR space from the perspective of the viewer avatar.

The viewer can cheer the distributor by operating a controller 101. When the viewer cheers for the distributor, the viewer terminal 5 sends a cheering signal to the server 1.

The configuration of the server 1, the distributor terminal 3, and a viewer terminal 5 in the present embodiment will now be described with reference to FIG. 3.

The server 1 shown in FIG. 3 includes a distribution unit 11, a reaction unit 12, a cheering detection unit 13, and a reaction data storage unit 14.

The distribution unit 11 sends and receives data necessary for the livestreaming service. Specifically, the distribution unit 11 receives voice data from the distributor and motion data for the distributor avatar from the distributor terminal 3, and distributes the voice data and the motion data to viewer terminals 5. The distribution unit 11 also receives motion data for a viewer avatar from the viewer terminal 5 of a viewer who is participating in the program, and distributes the motion data to the distributor terminal 3 and to viewer terminals 5. The distribution unit 11 may receive and distribute the voice data from a viewer. The distribution unit 11 may also receive and distribute a comment (text information) inputted by a viewer.

The reaction unit 12 replaces normal motion sent to a viewer terminal 5 of a cheering viewer with reaction motion based on a predetermined timing. Normal motion is motion based on movement by the distributor detected by the HMD 100 and the controllers 101. Reaction motion is reaction motion stored in the reaction data storage unit 14 and will be described later. The reaction unit 12 retrieves reaction motion from the reaction data storage unit 14 and sends it to the viewer terminal 5 of the cheering viewer as an individualized reaction motion to the cheering viewer avatar. An example of a reaction performed by the distributor avatar is a motion in which the distributor avatar turns toward the viewer avatar and winks. Because the VR space is rendered from the viewpoint of the viewer avatar, the viewer can feel that the distributor avatar has turned toward him or her in response to cheering. When the distributor avatar looks at the viewer avatar, an effect such as a beam of light or hearts may be displayed in the direction of the distributor avatar's gaze.

Other examples of reactions include turning the body of the distributor avatar toward the viewer avatar or having the distributor avatar draw closer to the viewer avatar. The reaction may change depending on the amount of cheering by the viewer (for example, the number of gifts sent). The reaction motion is selected from the motion data stored in the reaction data storage unit 14 described later. During a reaction motion, the distributor avatar may turn away from viewer avatars that are not cheering.

The reaction unit 12 determines the timing for the distributor avatar to react based on a reaction signal received from the distributor terminal 3. Alternatively, the reaction unit 12 may set a predetermined time after detecting a cheer as the reaction timing irrespective of the reaction signal. The reaction unit 12 may also determine the reaction timing based on movement by the distributor avatar. For example, the reaction timing may be set when the distributor avatar has raised both hands.

The distributor may also send a reaction motion. Here, the reaction motion received from the distributor terminal 3 is sent to the viewer terminal 5 of the viewer who cheered but the reaction motion is replaced with a normal motion and sent to the viewer terminals 5 of viewers who have not cheered.

The cheering detection unit 13 detects a viewer who has cheered the distributor, and instructs the reaction unit 12 to perform a reaction motion toward the viewer avatar of the viewer. The cheering detection unit 13 may detect cheering by a viewer by receiving a cheering signal from the viewer terminal 5. The cheering detection unit 13 may also detect cheering for the distributor based on movement by the viewer avatar. For example, the cheering detection unit 13 may detect that a viewer has cheered the distributor when the viewer avatar waves his or her arms at the distributor avatar. Alternatively, the cheering detection unit 13 may detect that a viewer has cheered the distributor when cheering by the viewer is audibly detected.

The reaction data storage unit 14 stores reaction motion data. The reaction data storage unit 14 may store a variety of reaction motions.

The distributor terminal 3 includes a VR function unit 31 and a reaction indicating unit 32.

The VR function unit 31 has functions required for livestreaming in a VR space, such as rendering the VR space and reflecting movement by the distributor in the distributor avatar in the VR space. For example, the VR function unit 31 determines a motion to be performed by the distributor avatar based on movement of the distributor's head detected by the HMD 100 and the movement of the distributor's hands detected by the controllers 101, and sends this motion data to the server 1.

The reaction indicating unit 32 receives a reaction operation from the distributor and sends a reaction signal to the server 1. For example, when a button on a controller 101 has been operated, a reaction signal is sent to the server 1. When the server 1 determines when to reply with a reaction to cheering, the distributor terminal 3 does not need to receive a reaction operation from the distributor.

A viewer terminal 5 includes a VR function unit 51 and a cheering indicating unit 52.

The VR function unit 51 has functions required for viewing a livestream in a VR space, such as rendering the VR space and reflecting movement by the viewer in the viewer avatar in the VR space.

The cheering indicating unit 52 receives a cheering operation from the viewer and sends a cheering signal to the server 1. The cheering indicating unit 52 causes the viewer avatar to make a cheering motion when needed.

The viewer can cheer, for example, by sending a gift or waving a hand. When the viewer sends a gift, a cheering signal is sent from the cheering indicating unit 52 to the server 1. A cheering operation is assigned to a button on a controller 101. When the viewer operates this button, a cheering signal may be sent and the viewer avatar may make a cheering motion.

Each unit in the server 1, the distributor terminal 3, and the viewer terminal 5 may be configured using a computer provided with an arithmetic processing unit and a storage device, and the processing of each unit may be executed by a program. This program can be stored in a storage device provided in the server 1, the distributor terminal 3, or the viewer terminal 5. The program can be recorded on a recording medium such as a magnetic disk, an optical disk or a semiconductor memory, or can be provided over a network.

Next, the start of livestreaming and participation of viewers in the livestream will be described with reference to the sequence chart in FIG. 4.

When the distributor uses the distributor terminal 3 to perform an operation that starts a livestream, the distributor terminal 3 notifies the server 1 that a livestream has started (step S11).

When the livestreaming has started, the distributor terminal 3 detects operations and movements performed by the distributor and sends motion data for controlling the distributor avatar to the server 1 (step S12). The server 1 distributes the motion data to the viewer terminals 5A-5C watching the livestream. During livestreaming, motion data is continuously sent from the distributor terminal 3 to the server 1 and motion data is continuously distributed from the server 1 to the viewer terminals 5A-5C.

When viewer A performs an operation to participate in the program using the viewer terminal 5A, the viewer terminal 5A notifies the server 1 that he or she will participate in the program (step S13).

When viewer A is participating in the program, viewer terminal 5A detects operations and movements performed by the viewer and sends motion data for controlling the viewer avatar to the server 1 (step S14). The server 1 distributes the motion data to the distributor terminal 3 and the other viewer terminals 5B-5C. While participating in the program, motion data is continuously sent from viewer terminal 5A to the server 1 and motion data is continuously distributed from the server 1 to the distributor terminal 3 and the other viewer terminals 5B-5C.

When viewer B performs an operation in the same manner as viewer A to participate in the program using viewer terminal 5B, viewer terminal 5B notifies the server 1 that the viewer will participate in the program (step S15), and starts sending motion data for controlling the viewer avatar of viewer B to the server 1 (step S16).

When viewer C performs an operation to participate in the program using viewer terminal 5C, the viewer terminal 5C notifies the server 1 that the viewer will participate in the program (step S17), and starts sending motion data for controlling the viewer avatar of viewer C to the server 1 (step S18).

FIG. 5 is a diagram showing the VR space in which the viewers are participating. In the VR space, as shown in the figure, only the distributor avatar 300 is on the stage and the viewer avatars 500A-500E participating in the program are below the stage. The viewers can see not only the distributor avatar 300 but also the viewer avatars 500A-500E of the viewers A to E who are participating in the program.

The distributor can see the VR space from the vantage point of the distributor avatar 300. Viewers A-E can see the VR space from the vantage points of their viewer avatars 500A-500E. In other words, the distributor terminal 3 renders the VR space based on the position and direction of the face of the distributor avatar 300, and the viewer terminals 5 render the VR space based on the position and direction of the face of each of the viewer avatars 500A-500E. In FIG. 5, viewers A-E see the distributor avatar 300 from different positions and at different angles.

The vantage point of viewers who are not participating in the program can be, for example, the position of a virtual camera placed by the distributor in a certain position in the VR space.

Next, the reaction of the distributor to cheering by a viewer will be described with reference to the sequence chart in FIG. 6.

When viewer A operates viewer terminal 5A to cheer the distributor, viewer terminal 5A sends a cheering signal to the server 1, and the server 1 notifies the distributor terminal 3 that viewer A has cheered (step S21). Here, it is assumed that viewers B and C have not cheered the distributor.

When the distributor has confirmed that viewer A has cheered him or her, he or she operates the distributor terminal 3 to send a reaction signal to the server 1 (step S22). The distributor performs a reaction operation to send a reaction signal, but the distributor himself or herself does not have to react. The distributor terminal 3 sends a normal motion based on movement by the distributor to the server 1 (step S23). When the reaction timing is determined by the server 1, the process of sending a reaction signal in step S22 is unnecessary.

When the server 1 receives the reaction signal, it replaces the normal motion with a reaction motion and sends the reaction motion to viewer terminal 5A that has sent a cheering signal (step S24), and sends the normal motion to the viewer terminals 5B-5C that have not sent a cheering signal (steps S25, S26). When a plurality of viewer terminals 5 have sent a cheering signal, a personal reaction motion is sent to each of the viewer terminals 5 that sent a cheering signal.

FIG. 7 is a diagram showing the VR space in which the distributor reacts to viewers. In this figure, it is assumed that viewers A and E (viewer avatars 500A and 500E) have cheered.

The distributor avatar 300 reacts individually to viewer avatars 500A and 500E that are the cheering viewer avatars 500A and 500E on the timing for the distributor avatar 300 to reply with a reaction to cheering. Specifically, when the distributor avatar 300 reacts, the server 1 sends a personal reaction motion for viewer avatar 500A to the viewer terminal 5A of viewer avatar 500A, and sends a personal reaction motion for viewer avatar 500E to the viewer terminal 5E of viewer avatar 500E. The same normal motion is sent to viewer terminals 5B, 5C, and SD of viewer avatars 500B, 500C, and 500D. In the VR space as seen by viewer A, distributor avatar 300A has approached viewer avatar 500A. In the VR space as seen by viewer E, distributor avatar 300E has approached viewer avatar 500E. In the VR space as seen by viewers B, C and D, the distributor avatar 300 is center stage. In other words, when the distributor avatar reacts, viewer A sees distributor avatar 300A making a personal reaction motion toward viewer avatar 500A, viewer E sees distributor avatar 300E making a personal reaction motion toward viewer avatar 500E, and viewers B, C and D see the distributor avatar 300 making the same normal motion. When the reaction by the distributor avatar has ended, the same normal motions by the distributor avatar are distributed to the viewer terminals 5A-5E.

The reaction motion may be a motion such as turning toward each of the viewer avatars 500A, 500E without changing the position of the distributor avatar 300. In this case as well, a personal reaction motion is sent to the viewer avatars 500A, 500E that have cheered.

When the distributor avatar 300 reacts to cheering, by making the personal reaction motion by the distributor avatar 300A, 300E toward the viewer avatars 500A, 500E that cheered different from the motion toward viewer avatars 500B, 500C, 500D that did not cheer, viewers A and E can each get a reaction from the distributor avatar.

2nd Embodiment

In the second embodiment, the viewer terminals perform the processing for replacing the normal motion of the distributor avatar with a reaction motion. The overall system configuration is similar to the configuration in the first embodiment.

The configuration of the server 1, the distributor terminal 3, and the viewer terminals 5 used in the livestreaming service of the second embodiment will now be described with reference to FIG. 8.

The server 1 includes a distribution unit 11. The distribution unit 11 sends and receives data necessary for the livestreaming service in a manner similar to the distribution unit 11 in the server 1 of the first embodiment.

The distributor terminal 3 includes a VR function unit 31. The VR function unit 31 has functions necessary for livestreaming in a VR space that are similar to those in the VR function unit 31 of the distributor terminal 3 in the first embodiment.

The viewer terminals 5 include a VR function unit 51, a cheering indicating unit 52, a reaction unit 53, and a reaction data storage unit 54.

The VR function unit 51 has functions necessary for livestreaming in a VR space that are similar to those in the VR function unit 31 of the viewer terminals 5 in the first embodiment.

The VR function unit 51 also replaces the normal motion performed by the distributor avatar received from the server 1 with a reaction motion based on an instruction from the reaction unit 53 when rendering the VR space.

The cheering indicating unit 52 receives a cheering operation from the viewer and notifies the reaction unit 53. The cheering indicating unit 52 also causes the viewer avatar to make a cheering motion if needed. This differs from the first embodiment in that a cheering signal is not sent to the server 1. Note that the cheering indicating unit 52 may send a cheering signal to the server 1 as in the first embodiment.

When the cheering indicating unit 52 inputs a cheering operation, the reaction unit 53 replaces the motion performed by the distributor avatar received from the server 1 with a reaction motion on a predetermined timing. The predetermined timing is determined by the reaction unit 53. The predetermined timing can be, for example, the time at which the cheering motion performed by the distributor avatar ends. In order to determine the reaction timing, a reaction signal may be received from the server 1 or the distributor terminal 3.

The reaction data storage unit 54 stores reaction motion data in the same manner as the reaction data storage unit 14 of the server 1 in the first embodiment.

Next, the processing performed by the viewer terminal 5 will be explained with reference to the flowchart in FIG. 9.

When the cheering indicating unit 52 inputs a cheering operation, the viewer avatar is made to cheer the distributor avatar and the reaction unit 53 is notified that the distributor has been cheered (step S31). The distributor may also be informed that the viewer has cheered.

The reaction unit 53 determines whether or not the reaction timing has occurred (step S32).

When the reaction timing has occurred, the reaction unit 53 replaces the motion performed by the distributor avatar received from the server 1 with a reaction motion stored in the reaction data storage unit 14 (step S33).

The reaction to cheering by the viewer will now be explained with reference to the sequence chart in FIG. 10.

The viewer terminal 5A inputs a cheering operation from the viewer A (step S41).

The distributor terminal 3 sends a normal motion to the server 1 (step S42), and the server 1 distributes the normal motion to the viewer terminals 5A-5C (steps S43 to S45).

When the reaction timing occurs, the viewer terminal 5A replaces the normal motion received by the server 1 with a reaction motion (step S46).

In this way, the viewer terminal 5A can detect cheering and replace the motion performed by the distributor avatar with a reaction motion in the viewer terminal 5A itself so that the viewer can get a reaction from the distributor avatar.

3rd Embodiment

In the third embodiment, the distributor terminal performs the processing for replacing the normal motion performed by the distributor avatar with a reaction motion. In the third embodiment, the distributor terminal 3 directly performs livestreaming to the viewer terminals 5 without going through a server 1. Livestreaming may of course be performed via a server 1 as well. Note that livestreaming may also be performed in the second embodiment without going through a server 1.

The configuration of distributor terminal 3 and the viewer terminals 5 used in the livestreaming service of the third embodiment will now be described with reference to FIG. 11.

In FIG. 11, there is a single viewer terminal 5, but the distributor terminal 3 performs livestreaming to a plurality of viewer terminals 5 in reality.

The distributor terminal 3 includes a VR function unit 31, a reaction indicating unit 32, a reaction unit 33, a cheering detection unit 34, and a reaction data storage unit 35.

The VR function unit 31 has functions necessary for livestreaming in a VR space that are similar to those in the VR function unit 31 of the distributor terminal 3 in the first embodiment.

The reaction indicating unit 32 receives the reaction operation from the distributor and notifies the reaction unit 33.

The reaction unit 33 replaces the normal motion sent to the viewer terminal 5 of a viewer that has cheered with the reaction motion in response to an instruction from the reaction indicating unit 32.

The cheering detection unit 34 detects the viewer who has cheered the distributor, and notifies the reaction unit 33 of the viewer who cheered the distributor.

The reaction data storage unit 35 stores reaction motion data in the same manner as the reaction data storage unit 14 in the server 1 of the first embodiment.

The processing performed by the distributor terminal 3 will now be explained with reference to the flowchart in FIG. 12.

When the cheering detection unit 34 detects cheering by a viewer, it notifies the reaction unit 33 (step S51), and the reaction unit 33 waits for an instruction from the reaction indicating unit 32 (step S52).

When the reaction indicating unit 32 has received a reaction operation and has notified the reaction unit 33, the reaction unit 33 sends a reaction motion stored in the reaction data storage unit 35 to the viewer terminal 5 of the viewer who cheered (step S53), and sends a normal motion to the viewer terminals 5 of viewers who did not cheer (step S54).

The reaction to cheering by a viewer will now be explained with reference to the sequence chart in FIG. 13.

When viewer A operates viewer terminal 5A to cheer the distributor, viewer terminal 5A sends a cheering signal to the distributor terminal 3 (step S61).

When the distributor confirms that viewer A has cheered him or her, he or she inputs a reaction operation to the distributor terminal 3 (step S62).

The distributor terminal 3 sends a reaction motion to viewer terminal 5A that sent the cheering signal (step S63), and sends a normal motion to the other viewer terminals 5B, 5C (step S64, S65).

Real-time distribution was performed in each of the embodiments described above. However, the present invention is not limited to real-time distribution. In each of the embodiments described above, a program in VR space that was distributed in the past or that has been prepared for distribution ("time-shifted distribution") can be used. In time-shifted distribution, data for VR space rendering including motion data for the distributor avatar is stored in a server or some other configuration. The server distributes the data (for example, distributor voice data, distributor avatar motion data, etc.) needed to play the program in VR space to a viewer terminal in response to a request from the viewer terminal. The viewer terminal renders the VR space based on data that has been received and plays the program. In time-shifted distribution, operations such as pause, rewind, and fast forward can be performed.

The data for a time-shifted program is stored in advance, but the distributor avatar can be made to react to cheers from the viewer by applying any of the embodiments described above. When reaction motion data is stored in a viewer terminal as described in the second embodiment, as soon as the viewer terminal detects a cheering operation performed by the viewer or once a predetermined amount of time has elapsed, reaction motion data for the distributor avatar stored in advance in the viewer terminal is retrieved, and the motion data for the distributor avatar received from the server is replaced with this reaction motion data. In this way, the viewer can see a performance in which the distributor responds to cheering by the viewer. Segments may be established in which motions performed by the distributor avatar cannot be replaced. For example, motion replacement can be prohibited while the distributor avatar is singing so that reaction motions occur during interludes. In time-shifted distribution, the reaction motions performed by the distributor avatar may be directed at the virtual camera rendered by the viewer terminal in VR space when the viewer is not participating in the program.

When the first embodiment and the third embodiment described above are applied to time-shifted distribution, the server or distributor terminal storing the reaction motion data detects cheering by a viewer, replaces motion performed by the distributor avatar with a reaction motion, and sends the reaction motion only to the viewer terminal.

In the embodiments described above, when cheering of the distributor avatar by viewer avatars is detected and the distributor avatar reacts to the cheering, a reaction motion is performed for the viewer avatars that cheered and a normal motion, not a reaction motion, is performed for viewer avatars that do not cheer. Because reaction motions are performed individually for the cheering viewer avatars, viewers more reliably get a reaction from the distributor.

In each of the embodiments described above, motion data, appearance data, and born-digital data, etc. in a VR space, including replaced data, is sent from a server 1 or a distributor terminal 3 to the viewer terminals 5 and the viewer terminals 5 receive and render the data. However, in both real-time distribution and time-shifted distribution, the server 1 or the distributor terminal 3 may render the VR space. For example, in the first embodiment where the server 1 replaces motions, information such as the position and direction of the virtual camera may be sent from the distributor terminal 3 or a viewer terminal 5 to the server 1, the VR space may be rendered by the server 1 to generate images based on information from the virtual camera, and the generated image may be sent to a viewer terminal 5. In both of these configurations, a viewer terminal 5 where cheering has been detected can view the rendered images after the motion has been replaced with a reaction motion. In the third embodiment, the distributor terminal 3 may render the VR space and send images as well.

REFERENCE SIGNS LIST

1: Server
11: Distribution unit
12: Reaction unit
13: Cheering detection unit
14: Reaction data storage unit
3: Distributor terminal
31: VR function unit
32: Reaction indicating unit
33: Reaction unit
34: Cheering detection unit
35: Reaction data storage unit
5: Viewer terminal
51: VR function unit
52: Cheering indicating unit
53: Reaction unit
54: Reaction data storage unit
100: HMD
101: Controller

The invention claimed is:

1. A distribution server configured to distribute motion data of a distributor avatar in a virtual space comprising:
a distribution unit configured to distribute the motion data of the distributor avatar;
a support detection unit configured to receive a support signal from a first viewer terminal to the distributor avatar; and
a reaction unit configured to cause the distributor avatar to react to the support signal,
wherein the support signal indicates an amount of cheering from the first viewer terminal.

2. A distribution server according to claim 1, wherein the reaction unit is further configured to:
display a reaction of the distributor avatar to the first viewer terminal, and
not display the reaction of the distributor avatar to a second viewer terminal.

3. The distribution server according to claim 1, wherein the reaction unit is further configured to display a reaction of the distributor avatar to the first viewer terminal at a different time than to a second viewer terminal.

4. The distribution server according to claim 1, wherein the reaction unit is configured to change a reaction of the distributor avatar displayed to the first viewer terminal according to an amount of support indicated by the support signal.

5. A viewer terminal configured to:
receive motion data of a distributor avatar in a virtual space; and
control the distributor avatar based on the received motion data,
wherein the viewer terminal comprises:
a support instruction unit configured to provide a support signal to the distributor avatar; and
a reaction unit configured to change a motion of the distributor avatar depending on whether the support signal indicates support for the distributor avatar,
wherein the support signal indicates an amount of cheering from the viewer terminal.

6. A method for distributing motion data of a distributor avatar in a virtual space comprising:
distributing the motion data of the distributor avatar to a first viewer terminal;
receiving a first support signal for the distributor avatar from the first viewer terminal; and
causing the distributor avatar to transmit a reaction signal to the first viewer terminal in reaction to the first support signal,
wherein the first support signal indicates an amount of cheering from the first viewer terminal.

7. The method according to claim 6, further comprising:
modifying the reaction signal to create a modified reaction signal; and
transmitting the modified reaction signal to a second viewer terminal,
wherein the second viewer terminal did not transmit a second support signal to the distributor avatar.

* * * * *